United States Patent [19]

Lovisek

[11] Patent Number: 4,741,654
[45] Date of Patent: May 3, 1988

[54] SPIDER WASHER HEAD FASTENERS

[75] Inventor: Louis J. Lovisek, Greenlawn, N.Y.

[73] Assignee: Industrial Fasteners Corp., Port Washington, N.Y.

[21] Appl. No.: 857,876

[22] Filed: May 1, 1986

[51] Int. Cl.⁴ .................... F16B 39/282; F16B 39/284
[52] U.S. Cl. ..................................... 411/186; 411/188; 411/165; 411/959
[58] Field of Search ............... 411/160, 161, 162, 163, 411/164, 165, 186, 187, 188, 189, 332, 957, 959

[56] References Cited

U.S. PATENT DOCUMENTS

| | | | |
|---|---|---|---|
| 367,196 | 7/1887 | Deblieux | 411/186 |
| 796,671 | 8/1905 | Palmer | 411/189 X |
| 1,368,604 | 2/1921 | Carmody | 411/163 X |
| 1,592,438 | 7/1926 | Brandt | 411/163 |
| 1,875,930 | 9/1932 | Martin | 411/186 |
| 1,911,384 | 5/1933 | Olson | 411/164 X |
| 1,926,917 | 9/1933 | Rosenberg | 411/163 |
| 1,933,871 | 11/1933 | Olson | 411/163 |
| 2,112,494 | 3/1938 | Olson | 411/187 |
| 2,226,491 | 12/1940 | Gustafson | 411/959 X |
| 2,509,158 | 5/1950 | Long | 411/163 |
| 2,619,416 | 11/1952 | Poupitch | 411/160 X |
| 2,675,844 | 4/1954 | Knohl | 411/164 X |
| 2,707,012 | 4/1955 | Cox | 411/165 |
| 3,343,580 | 9/1967 | Coldren | 411/959 X |
| 4,034,788 | 7/1977 | Melone | 411/165 X |
| 4,350,465 | 9/1982 | Lovisek | 411/165 X |

FOREIGN PATENT DOCUMENTS 557480 12/1974 Switzerland ..................... 411/165

Primary Examiner—Neill Wilson
Attorney, Agent, or Firm—Blum Kaplan

[57] ABSTRACT

A fastener having a body defining an axis of rotation extending downwardly from the body and formed integrally therewith is provided with a flange extending radially and downwardly from the body. The flange is slotted to define a plurality of deformable tabs joined at their respective bases to the body. At least a portion of each tab is twisted relative to its base about an axis extending along the flange radially from the axis of rotation in a direction so that the leading edge of each tab as defined by the slots, the edge being on the side of the tab facing in the direction of rotation of the fastener for tightening, projects downwardly.

23 Claims, 4 Drawing Sheets

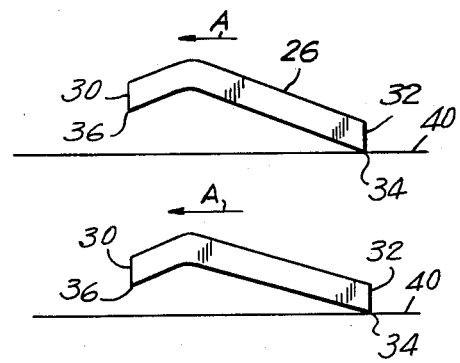
FIG. 6A
FIG. 6B
FIG. 6C
FIG. 6D
FIG. 6E
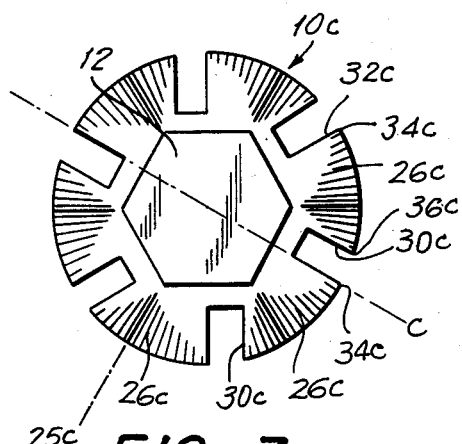
FIG. 7
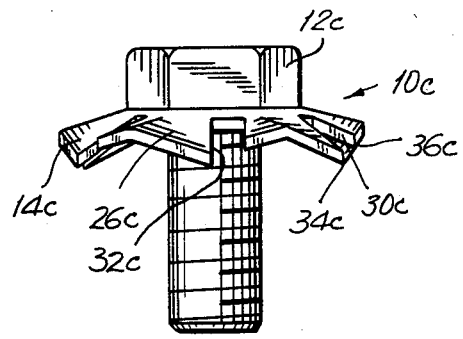
FIG. 8

SPIDER WASHER HEAD FASTENERS

BACKGROUND OF THE INVENTION

This invention relates generally to fasteners and, in particular, to screws and nuts having a self fastening feature.

The purpose of a self fastening feature in a screw or nut is to prevent undesired loosening of the screw or nut from engagement in a workpiece as a result of vibration and other factors. In the art, the primary self locking vehicle is a lockwasher positioned intermediate the head of the screw or nut and the surface of a workpiece. The lockwasher may be provided with teeth of various configurations which engage the surface of the workpiece to hold the screw or nut.

The "teeth" on the lockwasher are usually deformable during engagement to provide a bias on the screw threads and to increase the holding forces tending to hold a screw in position. Lockwashers have proved less than completely satisfactory because of the expense of separate parts and the use thereof and because of the possibility of some relative rotation between the lockwasher and the screw or nut, the screw or nut not being affirmatively held. A variation in the use of lockwashers is to capture a lockwasher on the body of the screw adjacent the head or on the nut. The lockwasher is still displaceable relative to the screw or nut and this arrangement has likewise not proved completely satisfactory.

In the art, it has been proposed to form tabs in flanges projecting radially from the head of a screw to serve the lockwasher function. Thus, in U.S. Pat. No. 2,226,491, it is proposed to twist a dome shaped flange (FIGS. 4-6) or a planar flange (FIGS. 7-9). In the former case the dome shape of the tabs prevents proper distortion during use while the planar tabs provide insufficient retaining force. In U.S. Pat. No. 3,343,580, it is proposed to twist a planar flange so that the lowermost projections of the tab define a sinusoidal envelope, an arrangement that does not provide maximum uniform force.

In U.S. Pat. No. 4,350,465 of the applicant herein, a spider washer head screw is disclosed and in U.S. patent application Ser. No. 800,198 of the applicant herein, a spider washer head nut is disclosed. Applicant hereby incorporates the teachings of his prior patent and of his prior application by reference as if fully set forth herein. These self locking screws and nuts are effective and avoid many of the deficiencies of the prior art. However, in certain situations, such screws and nuts are not useful because the screw or nut is stripped during tightening as a result of insufficient torque absorption.

By providing spider washer head fasteners having flanges integrally formed with the body of a screw or nut as more particularly described below, the deficiencies of the prior art have been avoided and new and highly effective screws and nuts are provided.

SUMMARY OF THE INVENTION

Generally speaking, in accordance with the invention, spider washer head fasteners are provided. The spider washer head fasteners are screws or nuts. The screws or nuts each have a body defining an axis of rotation, and a flange formed integrally with and extending radially and downwardly from the body. The flange is slotted to define a plurality of deformable tabs joined at their respective bases to the body. At least one portion of at least a portion of the tabs is twisted in a first direction relative to its base along an axis extending radially from the axis of rotation so that at least one edge of each of the tabs twisted in the first direction defined by the slots inclines downwardly, said edge being on the side of the tab facing in the direction of rotation of the screw or nut. Upon tightening of the screw or nut, the portion of the tabs twisted in said first direction engages the workpiece surface and resists tightening.

At least a portion of the tabs may be twisted in a second direction relative to its base along an axis extending radially from the axis of rotation so that at least one edge of each of the tabs twisted in the second direction defined by the slots inclines downwardly, said edges being on the side of the tabs facing in the direction opposite to the direction of rotation of the screw or nut. The respective ends of the edges facing in the direction of the tabs twisted in the second direction may essentially lie in a single plane extending normally to the axis of rotation. The bottom surface of the tabs twisted in the second direction defining an essentially straight line in radial cross-section except in the region of twist.

The tabs twisted in its first direction may be separate and alternate with the tabs twisted in the second direction. In the alternative, each tab may be in part twisted in the first direction and in part twisted in the second direction.

Accordingly, it is an object of the invention to provide spider washer head fasteners adapted to absorb torque during tightening in order to prevent stripping.

Another object of the invention is to provide self locking fasteners integrally formed and readily manufacturable which provide good electrical contact.

Yet another object of the invention is to provide spider washer head fasteners in the form of screws and nuts adapted to be both self locking and to absorb torque during tightening.

Still other objects and advantages of the invention will in part be obvious and will in part be apparent from the specification.

The invention accordingly comprises articles of manufacture possessing the features, properties, and the relation of elements which will be exemplified in the articles hereinafter described, and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 6A-B are a sequential showing of the end of the tab of the embodiment of FIGS. 1-3 during tightening;

FIG. 7 is a top plan view of an alternate embodiment of a spider washer head screw in accordance with the invention;

FIG. 8 is a perspective view of the spider washer head screw of FIG. 7;

DESCRIPTION OF THE PREFERRED EMBODIMENTS

This invention is directed to spider washer head fasteners. As used herein, the term "fasteners" is intended to mean screws and nuts. It is to be understood that any configuration described as being applicable to nuts is also applicable to screws and vice versa.

Figure 1:
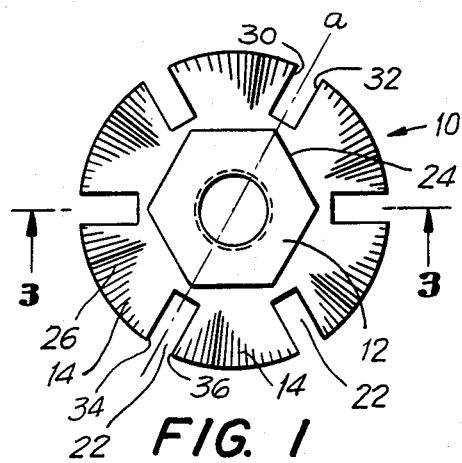
FIG. 1 is a top plan view of a spider washer head nut in accordance with the invention.
Figure 2:
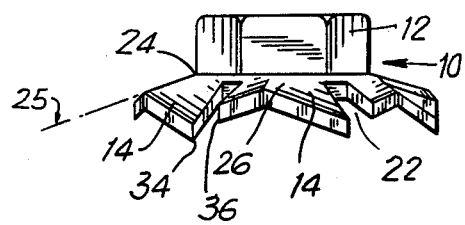
FIG. 2 is a perspective view of the spider washer head nut of FIG. 1.
Figure 3:
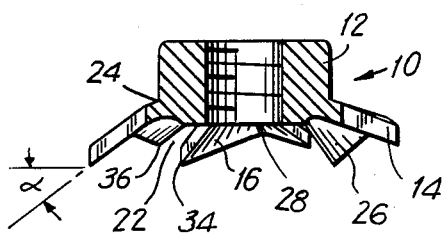
FIG. 3 is a cross-sectional view of a spider washer head nut of the invention taken along section line 3—3 of FIG. 1.

Referring to FIGS. 1-3, a spider washer head nut 10 consists of a nut body 12 formed integrally with downwardly extending flanges 14. As used in this application, the term "downwardly" refers to the direction projecting from the base 24 of nut body 12 along the direction of the axis of rotation of the nut 10. A radially and downwardly extending flange 14 is formed integrally with nut body 12 and joins nut body 12 along the base 24 of nut body 12. Flange 14 has a conical bottom surface 16, as more particularly shown in FIG. 3, defining an essentially straight line in radial cross-section. Bottom surface 16 of flange 14 defines an angle A with a plane extending normally to the axis of rotation which may fall in the range between about 5° and about 30°. In one embodiment, an angle of 15° has proved particularly effective.

While the nut body 12 is shown, by way of example, shaped hexagonally for cooperation with a suitably shaped socket wrench, any known body shape or configuration may be used, including an acorn or cap nut and a square nut. Threading of nut body 12 may be added before or after flange 14 is shaped in accordance with the invention, as more particularly described below.

Referring now to FIGS. 1-3, flange 14 is formed with a plurality of radially extending slots 22 defining tabs 26. Slots 22 must have sufficient width to permit the displacement of tabs 26 during tightening of the nut, and therefore cannot represent merely the slits which would be formed by relative shearing of adjacent tabs to define same. If the tabs were defined by mere slits, then adjacent tabs would interfere with each other, preventing full utilization of the deflection of the respective tabs for carrying out the desired self-locking purpose. It has been found that from 4 to 8 essentially equally spaced slots 22 should be provided, defining from 4 to 8 tabs 26 in order to produce the best results.

The efficiency of the spider washer head screws and nuts of the invention depends on the position of slots 22 in relation to the radii of the screws or nuts. When an edge of a slot is on a radius of the screw or nut, that edge is an efficient cutting edge. When the edge is off the radius and behind the radius, cutting efficiency is reduced, but torque absorption characteristics are enhanced. When the edge is off the radius and ahead of the radius, cutting efficiency is minimized and torque absorption is maximized.

As shown in FIG. 1, when neither the leading edge 30 nor trailing edge 32 of slot 22 is on a radius a, but both leading edge 30 and trailing edge 32 are parallel to radius a, efficiency of the nut 10 for cutting or backout is neither maximized nor minimized. Such a position of the leading and trailing edges 30 and 32 of slot 22 is a compromise position used when it is desirable to optimize both backout efficiency and torque absorption.

As more particularly seen in FIGS. 2 and 3, each of tabs 26 is twisted in two directions relative to base 24 adjacent nut body 12 about an axis extending radially from the axis of rotation of nut 10. The axis of twist of tab 26 is shown, by way of example, in FIG. 2 by chain line 25. As shown in FIG. 3, the bottom surface 16 of tab 26 still defines an essentially straight line in radial cross-section, except in the region of twist at the base of region 28 of tabs 26.

As more particularly seen in FIG. 2, twist is imparted to each tab 26 about axis of twist 25 in a clockwise direction so that the edge 32 of each tab 26 projects downwardly and, also, in a counter-clockwise direction so that the edge 30 of each tab 26 projects downwardly toward the bottom surface of a workpiece (not shown) to which nut 10 is to be secured. Downwardly inclined edge 32 is the trailing edge, that is, the edge on the side of tab 26 that faces opposite the direction of rotation of nut 10 during mounting, i.e. the counter-clockwise direction, and downwardly inclined edge 30 is the leading edge, that is, the edge on the side of tab 26 that faces the direction of rotation of nut 10 during mounting, i.e. the clockwise direction. Lower end points 34 of edges 32 of respective tabs 26 lie essentially in a single plane extending essentially normally to the axis of rotation of nut 10 so as to essentially engage the surface of the workpiece simultaneously. Similarly, lower end points 36 of edges 30 of respective tabs 26 lie essentially in a single plane extending essentially normally to the axis of rotation of nut 10. In this manner, torque is absorbed and retaining force is applied uniformly and gradually and each of tabs 26 is deflected essentially an equal distance during tightening.

As will be more particularly described below in connection with FIGS. 6A-E, when nut 10 is fully tightened, tabs 26 are at least partially flattened against the bottom surface of the workpiece in order to absorb torque during tightening and to provide a resilient holding force, tending to hold nut 10 in place and resist loosening. Although tabs 26 are never fully flattened, good electrical contact is provided between the spider washer head screw or nut and the workpiece because the tabs bite into the surface of the workpiece.

Both the lower end points 34 and 36 of trailing and leading edges 32 and 30, respectively, bite into the surface of the workpiece against which nut 10 is lightened to absorb torque and resist and prevent loosening. Thus, the spider washer head nut 10 in accordance with the invention offers not only the advantage of the bias forces, but the affirmative interaction between the edges 32 and 30 of tab 26 and the workpiece surface to resist loosening, whether such loosening is caused by vibration, temperature change, load shifting or the like.

Figure 4:
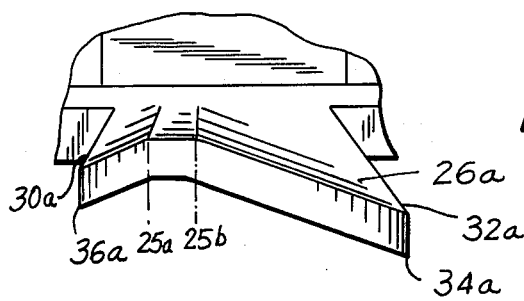
FIG. 4 is a perspective fragmentary view of an alternate embodiment of a tab for use on a spider washer head screw or nut of the invention.
Figure 5:
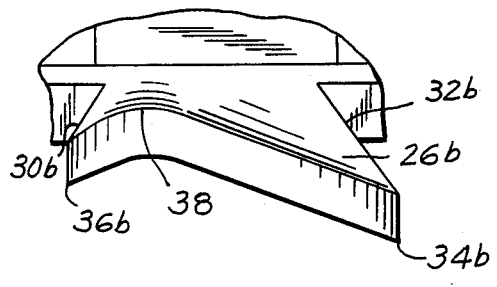
FIG. 5 is a perspective fragmentary view of another alternate embodiment of a tab for use on a spider washer head screw or nut in accordance with the invention.

FIGS. 4 and 5 show alternate embodiments of tabs 26a and 26b for use in spider washer head screws and nuts in accordance with the invention. Tab 26a shown in FIG. 4 has two different axes of twist 25a and 25b. Edge 30a is inclined downwardly in the counter-clockwise direction while edge 32a inclines downwardly in the clockwise direction. Lower end points 34a of edges 32a of tabs 26a lie essentially in a single plane extending essentially normally to the axis of rotation when tab 26a is positioned on a screw or nut in accordance with the invention. Similarly, lower end points 36a of edges 30a of tabs 26a lie essentially in a different single plane extending essentially normally to the axis of rotation of the screw or nut.

Tab 26b shown in FIG. 5 is similar except that the axis of twist is formed as a single smooth curve rather than a sharply defined crease. The characteristics of end points 34b and 36b are substantially the same as the characteristics of the end points shown in the embodiments described.

Referring now to FIGS. 6A-E, a sequential view of a tab during tightening is shown relative to surface 40 of the workpiece. As the fastener is rotated, tab 26 is displaced in the direction of arrow A. As the fastener body is drawn closer to surface 40, the portion of the tab extending from trailing edge 32 is flattened against point 34 scored surface 40 in an essentially spiral path of increasing radius. As shown in FIGS. 6C-D, point 36 and leading edge 30 eventually contact and bite into the surface cutting a curl of material from the surface to resist displacement of the fastener. The portion of the tab extending from leading edge 30 does not normally flatten substantially.

The cutting of point 36 and leading edge 30 into surface 40 during mounting absorbs a substantial portion of the torque of mounting, thereby preventing overtorquing and stripping of the threads. This feature is particularly significant where the workpiece is thin and the fastener has only one or a few threads which are easily stripped.

Once secured, the engagement of point 34 and trailing edge 32 with surface 40 serves to resist back out, since back out would require cutting into surface 40. The tab 26 thus both contributes to resistance of back out and absorbs mounting torque.

In an alternate embodiment shown in FIGS. 7 and 8 in which like reference numerals are applied to like elements, screw 10c differs from nut 10 of FIGS. 1-3 in that trailing edge 32c of each of tabs 26c is on a radius c of screw 10c. The axis of twist is shown by chain line 25c. In other respects, screw 10c functions in the same manner as nut 10 of FIGS. 1-3. However, since trailing edge 32c is on the radius, the trailing edge is the most efficient cutting edge. Leading edge 30c, which is off the radius and behind the radius is inefficient, but not to a maximum extent. Such a spider washer head screw 10c is useful when torque absorption is important and back out characteristics of the screw or nut are relatively unimportant.

While the head 12c is shown, by way of example, shaped hexagonally for cooperation with a suitably shaped socket wrench, any known head-shape or configuration may be used, including a slotted head and a Phillips head. However, while the body 14c is shown having a conventional configuration, any configuration may be utilized, including any of the self-tapping screw constructions which are available. Further, while the blank is shown threaded, the threading may be added before or after the flange is shaped in accordance with the invention as more particularly described below.

The invention and each of the embodiments is equally applicable to nuts, screws and bolts and the depiction of a particular embodiment in conjunction with only one such fastener is not to be construed in a limiting sense.

Figure 9:
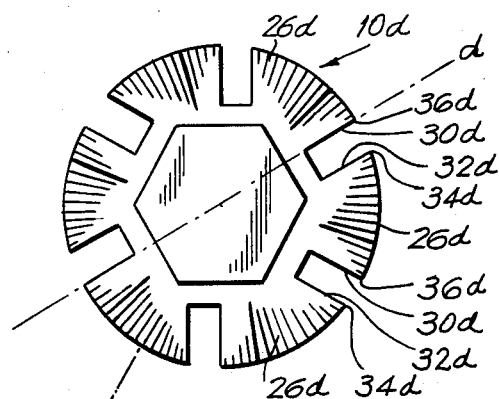
FIG. 9 is a top plan view of another alternate embodiment of a spider washer head screw in accordance with the invention.
Figure 10:
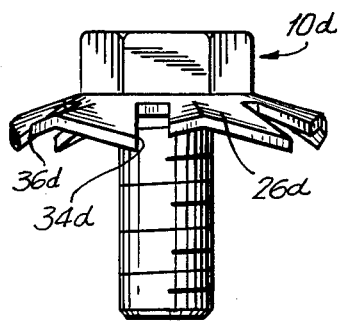
FIG. 10 is a perspective view of the spider washer head screw of FIG. 9.

In another alternate embodiment shown in FIGS. 9-10 in which like reference numerals are applied to like elements, screw 10d differs from the screws and nuts of the previously described configurations in that leading edges 30d are provided on radii d. The axis of twist is shown by chain line 26d. In other respects, screw 10d functions in the same manner as screws and nuts previously described. However, since leading edges 30d of tabs 26d are positioned on radii d of spider washer head screw 10d in accordance with the invention, spider washer head screw 10d is most efficient in terms of its back out characteristics and least efficient for torque absorption. This is especially true in view of the placement of trailing edge 32d parallel to and ahead of radii d.

Figure 11:
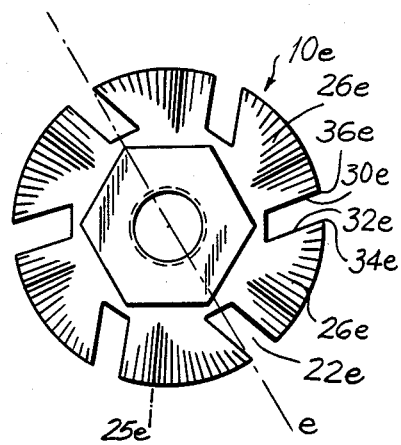
FIG. 11 is a top plan view of still another alternate embodiment of a spider washer head nut in accordance with the invention.
Figure 12:
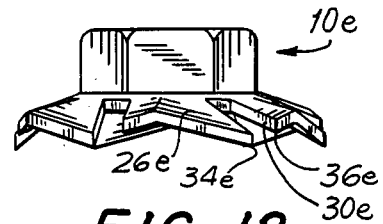
FIG. 12 is a perspective view of the spider washer head nut of FIG. 11.

In a further alternate embodiment shown in FIGS. 11 and 12, a spider washer head nut 10e in accordance with the invention is provided. Slot 22e is not centered on radius e nor are either of leading edge 30e or trailing edge 32e parallel to radius e. This embodiment provides maximum efficiency for back out protection. This results from the fact that the curl formed when nut 10e is loosened as a result of the digging of points 34 and trailing edge 32 is pushed into slot 22e by slanted trailing edge 32e to resist back out. Similarly, back out protection is provided by the lessening of torque absorption resulting from directing of the curl produced by point 36e and leading edge 30e away from slot 22e and out of the path of leading edge 30e.

Figure 13:
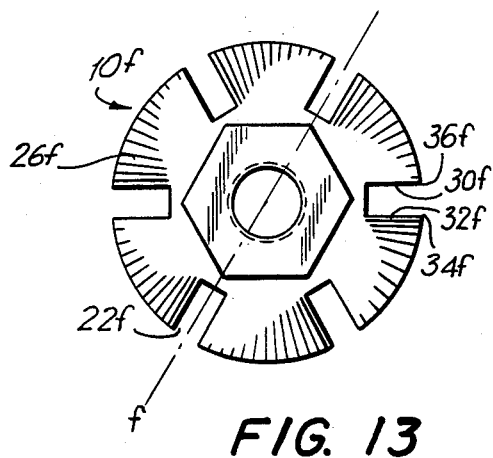
FIG. 13 is a top plan view of a further alternate embodiment of a spider washer head nut in accordance with the invention.
Figure 14:
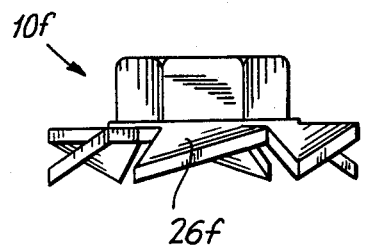
FIG. 14 is a perspective view of the spider washer head screw of FIG. 13.

A further alternate embodiment of the invention is shown in FIGS. 13 and 14. Nut 10f differs from the screws and nuts of the previous embodiments in that no back out protection twist of tab 26f is provided. Instead, tab 26f is twisted to incline downwardly in a counter-clockwise direction so that end point 36f of leading edge 30f digs into a workpiece in order to absorb torque. Slots 22 can be centered or not centered on any radii f in accordance with any of the previously described embodiments. Depending on how slot 22f is centered or angled on radius f will determine the efficiency of torque absorption. The tab may be provided with varying relative widths of twist in the two directions. The only limitation is that if back out protection is required, points 34 must project below points 36.

Figure 15:
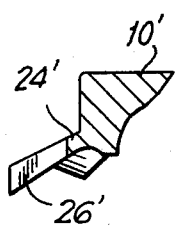
FIG. 15 is a fragmentary sectional side elevational view of an alternate tab constructed and arranged in accordance with the invention.
Figure 16:
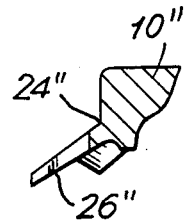
FIG. 16 is a fragmentary sectional side elevational view of a further alternate embodiment of a tab constructed and arranged in accordance with the invention.

Alternate embodiments of tabs 26' and 26" are shown in FIGS. 15 and 16. In FIG. 15 tab 26' is wider at the end opposite attachment of tab 26' to base 24' of screw or nut 10'. In FIG. 16 tab 26" is narrower at the end opposite attachment of tab 26" to base 24" of spider washer head screw or nut 10" than at the end adjacent base 24" is provided. Either of these alternate tab arrangements can be used in any of the embodiments of the spider washer head screws or nuts discussed herein above. The embodiment of FIG. 15 resists deflection while the embodiment of FIG. 16 eases deflection of the tab.

Accordingly, if back out protection is provided, thermal changes and vibrations of the assembled screw or nut and workpiece are absorbed by the spring action of the tabs. If any longitudinal looseness along the nut is developed, the spring action and back out resistance of the tabs will hold the nut in position. In addition, the resistance to releasing rotation caused by continual engagement of the point of the end of the trailing edge with virgin surface areas of the workpiece serves to prevent undesired rotational release.

Furthermore, the angle of the leading edge serves to prevent torque absorption caused by tightening of the screw or nut in the workpiece. Accordingly, stripping of the screw or nut is prevented.

An additional advantage of the arrangement in accordance with the invention over the provision of a separate or captured lockwasher is in the case of soft materials such as copper or aluminum bus bars. Where a lockwasher is used, the relatively soft material of the bus bars will permit relative rotation of a screw or nut and a lockwasher even after full tightening, causing stripping of the screw or nut. On the other hand, where the self-locking feature is formed integrally with the screw or nut body, controlled tightening is possible and stripping of the screw or nut can be avoided. Additionally, good electrical contact is provided.

It will thus be seen that the objects set forth above among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fail therebetween.

What is claimed is:

1. A fastener having a threaded body defining an axis of rotation, a flange formed integrally with and extending radially downwardly from said body, said flange being slotted essentially to the base thereof to define a plurality of deformable tabs joined at their respective bases to the body, at least a portion of a plurality of the tabs being twisted relative to its base about an axis extending radially from said axis of rotation along the flange in a direction so that an edge of each of the tabs defined by the slots inclines downwardly, said edge being the leading edge on the side of the tab facing in the direction of rotation of the fastener for tightening thereof, whereby the end of said leading edge and said leading edge cut into the surface of a workpiece during tightening to absorb a portion of the mounting torque.

2. The fastener of claim 1, wherein at least a portion of each tab is twisted further relative to its base about a second axis extending radially from said axis of rotation along the flange in a direction so that an edge of each of the tabs defined by the slots inclines downwardly said edge being the trailing edge on the side of the tab facing in the direction of rotation of the fastener for removal thereof.

3. The fastener of claim 2, wherein the first axis is the same as the second axis.

4. The fastener of claim 1, wherein essentially the entire tab is twisted.

5. The fastener of claim 1, wherein the axis of twist is positioned intermediate the respective radially extending edges of each tab.

6. The fastener of claim 1, wherein the flange is inclined to a plane extending normally to the axis of rotation at an angle equal to between about 5° and 30°.

7. The fastener of claim 6, wherein the angle is about 15°.

8. The fastener of claim 1, wherein the tab is twisted about the first axis of twist by an angle up to about 45°.

9. The fastener of claim 8, wherein the first angle of twist is about 10°.

10. The fastener of claim 2, wherein the respective ends of the trailing edges of the tabs essentially lie in a single plane extending normally to the axis of rotation of the fastener.

11. The fastener of claim 1, wherein the fastener is a nut.

12. The fastener of claim 2, wherein the fastener is a nut.

13. The fastener of claim 1, wherein the fastener is a screw.

14. The fastener of claim 2, wherein the fastener is a screw.

15. The fastener of claim 2, wherein the body has radii extending through the axis of rotation and the leading edge of each tab is parallel to and behind a radius and wherein the trailing edge of each tab is parallel to and behind a radius.

16. The fastener of claim 2, wherein the body has radii extending through the axis of rotation and the leading edge of each tab is parallel to and behind a radius and wherein the trailing edge is on a radius.

17. The fastener of claim 2, wherein the body has radii extending through the axis of rotation and the leading edge of each tab is on a radius and wherein the trailing edge of each tab is parallel to and ahead of a radius.

18. The fastener of claim 2, wherein the body has radii extending through the axis of rotation and neither the leading edge of each tab nor the trailing edge of each tab are parallel to a radius.

19. The fastener of claim 18, wherein the leading edge and trailing edge are parallel to each other.

20. The fastener of claim 19, wherein the leading edge is behind a radius and the trailing edge is ahead of a radius.

21. The fastener of claim 1, wherein the tabs are tapered so that the thinnest portion of the tab is at the base.

22. The fastener of claim 1, wherein the tabs are tapered so that the thickest portion of the tab is at the base.

23. The fastener of claim 2, wherein the bottom surface of the tabs define an essentially straight line in radial cross-section.

* * * * *